F. L. WILLIAMS.
PEDAL EXTENSION.
APPLICATION FILED DEC. 17, 1917.

1,346,361.

Patented July 13, 1920.

Inventor
Frank Lester Williams.

Witness
Charles Balg
Karl H. Butler

By
Attorneys

UNITED STATES PATENT OFFICE.

FRANK LESTER WILLIAMS, OF DETROIT, MICHIGAN.

PEDAL EXTENSION.

1,346,361.  Specification of Letters Patent.  Patented July 13, 1920.

Application filed December 17, 1917. Serial No. 207,534.

*To all whom it may concern:*

Be it known that I, FRANK LESTER WILLIAMS, a citizen of the United States of America, residing at Detroit, in the county of Wayne and State of Michigan, have invented certain new and useful Improvements in Pedal Extensions, of which the following is a specification, reference being had therein to the accompanying drawings.

This invention relates to an extension for foot pedals and has special reference to a foot pedal attachment that can be advantageously used in connection with the control pedals or treadles of automobiles and other self propelled vehicles.

The object of my invention is to provide a simple, durable and inexpensive pedal attachment that may be easily and quickly installed, so that a person may conveniently actuate the control pedal to which the extension is attached, said extension being designed to permit of a short or long limb properly operating the control pedal or treadle.

The pedal extension is of extremely light weight so as not to overbalance the pedal or treadle to which it is attached and the detailed construction of the extension will be hereinafter specifically described and then claimed.

Reference will now be had to the drawings, wherein there is illustrated a preferred embodiment of my invention, and it is to be understood that the structural elements are susceptible to such variations and modifications as fall within the scope of the appended claims.

Figure 1:
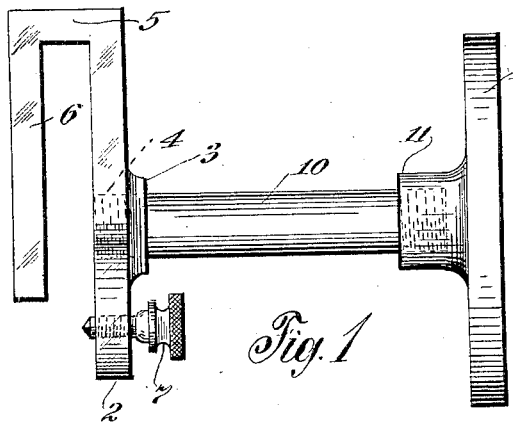
Figure 1 is a side elevation of the pedal extension.
Figure 2:
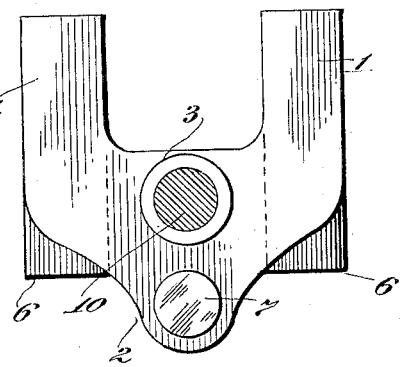
Fig. 2 is a cross sectional view of the same.
Figure 3:
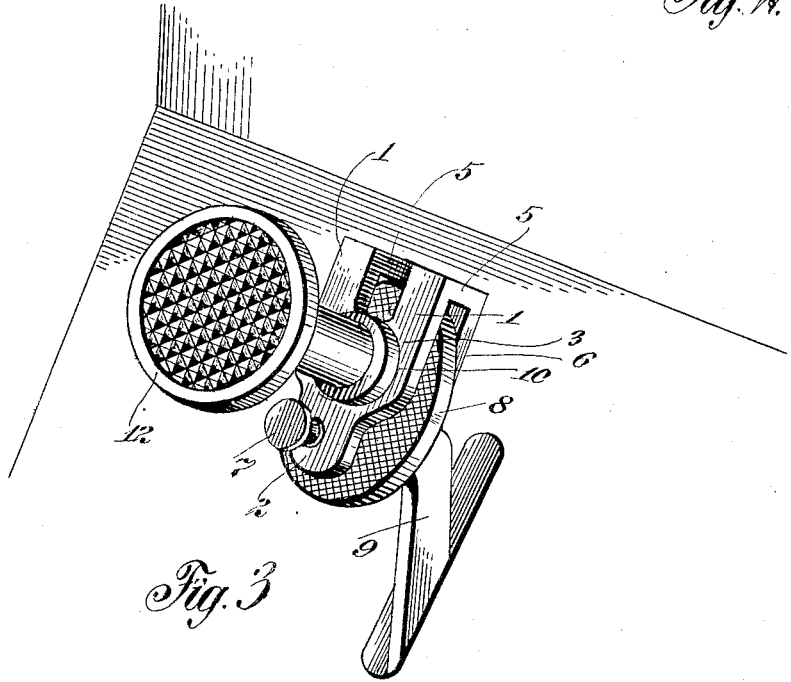
Fig. 3 is a perspective view of the extension as attached to the ordinary control pedal.

The pedal attachment comprises a substantially Y-shaped plate, having parallel arms 1 and a depending lug 2. At the juncture of the arms 1 and the lug 2 there is a boss 3 provided with an opening 4 having the walls thereof screwthreaded.

The upper ends of the arms 1 are provided with lateral extensions 5 and depending gripping members or arms 6, said gripping members or arms being disposed in parallelism relatively to each other and also to the arms 1.

The lug 2 is provided with an adjustable set screw 7 and this set screw is adapted to coöperate with gripping members or arms 6 in locking the Y-shaped plate on the head 8 of a control pedal or treadle 9. The Y-shaped plate is fitted down over the upper edge of the head 8 so that the arms 1 will be on the front side of the head 8 and the gripping members or arms 6 on the rear side thereof, and by tightening the set screw 7 against the front face of the head 8, the gripping members or arms 6 will be drawn into snug engagement with the rear face of the head 8 to firmly hold the Y shaped plate in position.

Screwed into the opening 4 of the boss 3 is the inner exteriorly screwthreaded end of a post 10, and the outer end of the post is exteriorly screwthreaded so that the socket 11 of a tread piece 12 may be screwed onto the post. The tread piece 12 is somewhat similar to the head 8 of the pedal or treadle 9, and the length of the post 10 determines the space between the tread piece 12 and the head 8 of the pedal or treadle. By using a post of desired length the tread piece 12 may be placed a certain distance from the head 8 and maintained in parallelism therewith so that the tread piece 12 may be used in lieu of the head 8 to actuate the pedal or treadle 9.

The Y shaped plate and the tread piece may be made of aluminum, and this is also true of the post 10, although it is preferable to make the post of brass or more indurate metal than the tread piece 12 so that there will be no danger of the post bending or breaking when pressure is brought to bear on the tread piece 12 to depress or actuate the pedal or treadle 9.

What I claim is:—

1. A pedal attachment comprising a member recessed to provide walls overlying the opposite faces of a normal pedal with the walls joined to form a stop formation to limit the movement of the member into position, said member being slotted throughout the length of one wall, the stop formation and a portion of the opposite wall, a pedal extension secured to and projecting from said latter wall adjacent to and in alinement with the inner end of the slot to locate the extension on a non-slotted portion of the member, the extension carrying a pedal face adapted to extend in approximate parallelism with the normal pedal face, said member carrying a threaded element adapted to engage the face of the normal pedal, said extension being positioned intermediate said element and the slot.

2. A pedal attachment comprising a member recessed to provide opposing walls adapted to overlie the opposite faces of a normal pedal with the upper wall of greater length than the lower wall, said walls being joined to produce a stop formation at the bottom of the recess, a threaded element carried by the upper wall adjacent its outer end and adapted to engage the upper face of the normal pedal, and an extension carried by the upper wall and projecting therefrom at a point intermediate the stop formation and said element, said extension carrying a pedal face extending in approximately parallelism with the normal pedal face and spaced therefrom.

In testimony whereof I affix my signature in the presence of two witnesses.

FRANK LESTER WILLIAMS.

Witness:
O. F. BARTHEL,
ANNA M. DORR.